Patented Mar. 14, 1950

2,500,197

UNITED STATES PATENT OFFICE 2,500,197

HYDROCARBON CONVERSION PROCESS AND CATALYST THEREFOR

Wilhelm Michael, Ludwigshafen-on-Rhine, Otto Goehre, Heidelberg, and Gerhard Free and Wilhelm v. Fuener, Ludwigshafen-on-Rhine, and Wilhelm Schneider, Mannheim, Germany; vested in the Attorney General of the United States No Drawing. Original application July 30, 1938, Serial No. 222,144, now Patent No. 2,355,388, dated August 8, 1944. Divided and this application July 13, 1940, Serial No. 345,366. In Germany August 9, 1937

2 Claims. (Cl. 196—52)

The present invention relates to a process for the thermal treatment of carbonaceous material.

We have found that highly efficient catalysts for the thermal treatment of carbonaceous materials, more particularly for the splitting of these materials, are obtained by mixing moist mineral gels with a metal salt solution and heating the mixture, if desired after the addition of a precipitant.

The gels are prepared from the solution of these salts of the elements of the 3rd and 4th groups of the periodic system which are capable of forming gels, especially of silicon, titanium, zirconium, thorium, cerium or aluminum, by the addition of suitable precipitants, as for example acids or salts.

The catalyst may be prepared by mixing the gel, preferably a silica gen, precipitated from a silicate solution or a mixture of several gels with a solution of one or several metal salts, especially salts of the metals of the 2nd to the 8th groups of the periodic system, and more particularly of magnesium or aluminum, of titanium, tin, zinc, and the metals of the 5th, 6th or the iron group and then heating the mixture in order to eliminate the whole or the bulk of the moisture. For this purpose the mixture may for example be evaporated to dryness, whereupon heating is preferably continued up to temperatures of 250° C., or even higher, say of the range of from 300 to 400° C., in order that the metal salts deposited on the gel are converted into other compounds.

The mixture of gel and metal salt solution may also be evaporated at about 100° C., filtered, prior to dryness washed, if desired, for removing the precipitant employed for the precipitant employed for the preparation of the gel, then dried and, if desired, heated up to a higher temperature.

The gel may also, before the addition of the metal salt solution, be freed from the precipitant and then further used in the manner described.

Catalysts of a high efficiency can also be obtained by adding a precipitant, for example ammonia, ammonium carbonate, ammonium sulphide or caustic alkali lyes, either while or after mixing the gel with the metal salt solution. The precipitant may also be added to the gel before the addition of the metal salt solution. It is not necessary to separate the gel from the aqueous liquid prior to adding the metal salt solution or the precipitant.

The catalysts may also be prepared by mixing of solutions of gel-forming substances with solutions of one or more metal salts without practically any precipitation taking place and subsequently adding one or more precipitants to the mixture. The formation of a precipitate is avoided in known manner for example by the addition of acids, such as dilute hydrochloric acid. The precipitant should be capable of precipitating both the gel and the metal salt. For this reason it is sometimes necessary to use more than one precipitant. The precipitant may also be added in such manner that for example the agent promoting formation of the gel is first added and then the agent serving to precipitate the metal salt.

The preparation of the catalyst may also be carried out in the presence of bleaching earths or bauxite or similar substances.

The gel is filtered off from the solution along with the metal compound precipitated, washed for removing particularly the alkaline precipitant and dried. It may be advantageous to expose the catalyst to high temperatures if desired in the presence of reducing gases before its use, for example by slowly heating it to from 450° to 800° C.

The gel and the metal salt solution are mixed in such a proportion that the catalyst contains from about 10 to 98 per cent, for instance from 60 to 90 per cent of the gel. For the cracking and destructive or refining hydrogenation processes such catalysts are very suitable as contain from about 10 to 75 per cent, preferably from 30 to 75 per cent of gel. When using for the preparation of such a catalyst silica as gel and alumina as gel or as the metallic component, if desired together with other gel-forming or metallic substances, the ratio of $SiO_2$ to $Al_2O_3$ may be less than about 75 to 25.

The following table shows for example the constituents of catalysts suitable for the thermal treatment of carbonaceous material, prepared in the said manner, but the invention is not restricted to the use of these catalysts.

| | |
|---|---|
| Si—Mg | Si—Mg—Al |
| Si—Al | Al |
| Si | Al—Mg |
| Si—Mg | Si—Mg—Al |
| Si—Al | Al—Mg | together with one or more of the following metals:

Zn, Sn, Ti, V, Cr, Mo, W, Fe, Ni and Co.

The catalyst may also be mixed with carbonaceous substances, as for example graphite or lignite small coke, shaped and then heated to from about 500° to 600° C.

The catalyst thus obtained contains the metal compound in a state of fine distribution within the gel. If the gel is mixed with a metal compound previously precipitated, a catalyst is obtained having only a poor efficiency, even when the mixing is done while intensely stirring.

Another advantage in the catalyst prepared according to the present invention resides in the fact that its efficiency can be easily restored to the full intial value by a treatment, for example with oxidizing gases, at an elevated temperature.

This treatment may be carried out at high temperatures up to about 800° C. whereas when regenerating siliceous catalysts not obtained by precipitation from solutions of gel-forming substances, for example natural bleaching earths, temperatures surpassing about 500° C. must not be employed as otherwise the catalyst would be damaged. The maintenance of such a low temperature in regenerating the catalyst wherein exothermic reactions take place is only possible with a careful control of the temperature and of the oxygen content of the oxidizing gases used and is therefore very troublesome.

In the cracking and hydrogenation processes the formation of gaseous substances is considerably reduced by the use of the said catalysts if the metal or metal compounds are completely or partially dissolved out for instance with the aid of inorganic or organic acids. The resulting product is then freed from acid, preferably by washing, dried and brought into a suitable shape.

The efficiency of the catalyst may be still further increased by an addition of boric acid. The use of the latter type of catalyst results in a specially high output of a highly anti-knock benzine.

The boric acid may be added to the gel in a solid or liquid form either before or after the addition of the metal salt solution or the precipitant, or after the filtration, or before, after or during the heating.

The amount of boric acid added may vary within wide limits, the preferred amount being from 0.5 to 30 per cent calculated with reference to the dry mixture of gel and metal compound.

The catalysts claimed or mixtures thereof are especially adapted for use in splitting carbonaceous materials, such as mineral oils, tars, extraction products of solid carbonaceous materials, cracked products, destructive hydrogenation products of coal, tars, mineral oils or wood, or oils produced synthetically from carbon monoxide and hydrogen, as well as fractions of the said oils. The splitting is preferably carried out at temperatures of between about 300 and 700° C. or more, at ordinary, reduced or increased pressure, for example at between 10 and 200 atmospheres, if desired in the presence of gases, such as hydrogen, steam, nitrogen or oxides of carbon.

The catalysts are also very suitable for the hydrogenation of the said substances particularly when working at pressures above 300 atmospheres, for instance 400 to 800 atmospheres. In this case preferably a catalyst is used containing silica and alumina and if desired in addition thereto metals as magnesium, iron, cobalt, nickel, tungsten, molybdenum, chromium, manganese, vanadium or uranium or their compounds in amounts from 0.5 to 25 per cent or more.

When using as initial materials for cracking or hydrogenation processes hydrocarbons very rich in hydrogen for instance hydrocarbons obtained by the reaction of carbon monoxide with hydrogen, pure paraffin-base petroleums or hydrocarbons rich in hydrogen obtained by pressure hydrogenation and/or with the aid of selective solvents and which contain at least 15 grams of hydrogen for each 100 grams of carbon, or fractions of the said substances, not only is a good yield of benzine obtained but there is only a relatively small formation of gas if multicomponent catalysts are used which have been prepared in the said manner by mixing gel substances with a magnesium salt solution. A catalyst containing mainly magnesia and silicic acid and preferably also a small amount of zinc is especially suitable.

Other thermal treatments of carbonaceous substances for which the said catalysts are suitable are the polymerization, alkylation, isomerizing, desulphurizing and refining of hydrocarbon oils.

The following examples will further illustrate how the said invention may be carried out in practice but the invention is not restricted to these examples. The parts are by weight unless otherwise stated.

*Example 1*

100 grams of sodium silicate containing 28.1 grams of $SiO_2$ are diluted with 900 grams of water and a solution of 22.5 grams of ammonium chloride in 150 cubic centimetres of water is added to the mixture while stirring. The silica gel thus precipitated is filtered off, washed, made up into paste with 28 grams of aluminum nitrate while still in a moist condition, dried on the water bath and then heated until nitrous gases no longer escape.

If a middle oil derived from a German mineral oil be passed over the said catalyst at 460° C. under atmospheric pressure, almost half of the oil is obtained as a highly anti-knock benzine. Only a few per cent of the initial material are gasified or converted into condensation products. The efficiency of the catalyst, when diminished after prolonged use, may be restored by heating the catalyst with gases containing oxygen.

*Example 2*

1 part of sodium silicate containing 0.28 part of silicic acid is diluted with 9 parts of water and the silicic acid is precipitated by means of a solution of 0.23 part of ammonium chloride and 1.5 parts of water. There are then added, while stirring, a solution of 0.28 part of aluminum nitrate (9 $H_2O$) and 1.5 parts of water, and concentrated ammonia water until the reaction has turned alkaline. The whole is then boiled, filtered and the precipitate washed with hot water and dried at 200° C.

The dry gel is pea-sized and entered into a reaction vessel through which the vapors of a middle oil derived from a German mineral oil and having a boiling point range of from 200° to 350° C. are passed at a temperature of 460° C. and under atmospheric pressure. The output is equal to that of Example 1.

*Example 3*

500 cubic centimetres of commercial water-glass solution (2.1 gram molecules of $SiO_2$) are diluted with water to 3 litres and 140 cubic centimetres of concentrated hydrochloric acid are added while stirring vigorously (pH value of the mixture below 4). A solution of 687 grams of $Al(NO_3)_3.9H_2O$ is then introduced, no precipitation taking place. By neutralization with ammonia, a silicic acid gel containing aluminum is then precipitated, washed well, dried, shaped and heated in a current of air at from 400° to 450° C.

Over a catalyst prepared in the said manner there are led for 2 hours vapors of a petroleum middle oil at a temperature of 460° C., the throughput being 0.5 liter of oil per litre of catalyst per hour. A product is obtained consisting to the extent of 40 per cent of liquid fractions boiling up to 200° C. which have very good non-knocking properties.

*Example 4*

100 grams of sodium silicate containing 28.1 grams of $SiO_2$ are diluted with 900 grams of water and mixed with a solution of 22.5 grams of ammonium chloride and 150 cubic centimetres of water while stirring.

A solution of 28.4 grams of aluminum nitrate (9 $H_2O$) and 150 cubic centimetres of water, and ammonia are added to this mixture, while stirring, until an alkaline reaction is obtained.

The whole is boiled up, filtered while still hot and washed with hot water. The filtrate while still moist is mixed with 2 grams of boric acid, made up into homogeneous paste while stirring and then heated at 250° C. for about 10 hours.

If a middle oil obtained from a German mineral oil be passed over this catalyst at 460° C. and under atmospheric pressure, the output amounts to about 50 kilograms of benzine for each 100 kilograms of middle oil, the said benzine having an octane value of 85.

*Example 5*

50 litres of sodium silicate solution having a specific gravity of 1.32 are diluted with water to about 300 litres and 14 litres of concentrated hydrochloric acid are slowly added while stirring. To the gel thus formed there is added while stirring a solution of 102 kilograms of crystallized magnesium chloride (containing six molecules of water of crystallization) in 100 litres of water; precipitation is then effected with concentrated ammonia water and the whole heated to boiling. The precipitate formed is filtered off, washed out with hot water and dried at 120° C.

The dry gel is comminuted to the size of peas and there is led thereover at 460° C. and at atmospheric pressure the vapor of a hydrocarbon mixture boiling at from about 200° to 330° C. obtained by the reaction of carbon monoxide with hydrogen. By a single passage over the catalyst there are obtained about 20 per cent by weight of benzine (with reference to the hydrocarbon mixture used) and about 1.5 per cent by weight of gas mainly containing propane and butane, in addition to traces of hydrocarbons of lower molecular weight.

*Example 6*

To 500 cubic centimetres of sodium silicate solution having a specific gravity of 1.32 diluted with water to 3 litres are added 160 cubic centimetres of concentrated hydrochloric acid and then a solution of 2750 grams of $Al(NO_3)_3.9H_2O$ in 8 litres of water. To the mixture ammonia water is added until an alkaline reaction is obtained. The precipitate formed is separated by filtration, washed out with water, dried, shaped and heated to 150° C.

If this catalyst which contains 66 per cent of $Al_2O_3$ and 34 per cent of $SiO_2$ is used for cracking paraffin-basic middle oils at 460° C. a product is obtained containing 30 per cent of benzine. The higher boiling constituents of the product are recycled to the reaction chamber. After one hour the catalyst is regenerated and again used for the same process.

This application has been divided out of application Ser. No. 222,144, filed July 30, 1938, which is now Patent No. 2,355,388, dated August 8, 1944.

What we claim is:

1. The process of making an active catalyst which consists in precipitating 1 part of sodium silicate containing about 0.28 part of silicic acid diluted with about 9 parts of water with a solution of about 0.23 part of ammonium chloride in about 1.5 parts of water, adding thereto while stirring a solution of about 0.23 part of aluminum nitrate ($9H_2O$) and about 1.5 parts of water and concentrated ammonia water until the reaction is alkaline, then boiling, filtering the precipitate, washing and drying at about 200° C., thereby producing an active catalyst.

2. The process of making gasoline which consists in filling a reaction vessel with the active catalyst of claim 1 and passing therethrough the vapors of a hydrocarbon oil having a boiling point range of from 200° C. to 350° C. under atmospheric pressure at a temperature of 460° C. producing a quantity of a high anti-knock gasolene equal to almost half of the oil processed without permanently gasifying more than a few per cent of the initial material or the conversion into other condensation products.

WILHELM MICHAEL.
OTTO GOEHRE.
GERHARD FREE.
WILHELM v. FUENER.
WILHELM SCHNEIDER.

REFERENCES CITED

The following references are of record in the file of this patent:

UNITED STATES PATENTS

| Number | Name | Date |
| --- | --- | --- |
| 1,728,732 | Jaeger | Sept. 17, 1929 |
| 1,840,450 | Jaeger et al. | Jan. 12, 1932 |
| 1,985,343 | Connolly et al. | Dec. 25, 1934 |
| 2,068,016 | Gyer | Jan. 19, 1937 |
| 2,129,142 | Kuentzel et al. | Sept. 6, 1938 |
| 2,141,185 | Houdry | Dec. 27, 1938 |
| 2,161,984 | Sweeney et al. | June 13, 1939 |
| 2,206,021 | Blunck | July 2, 1940 |
| 2,212,034 | Morrell et al. | Aug. 20, 1940 |
| 2,213,345 | Marschner | Sept. 3, 1940 |
| 2,216,262 | Bloch et al. | Oct. 1, 1940 |
| 2,247,535 | Voorhees | July 1, 1941 |
| 2,257,157 | Connolly | Sept. 30, 1941 |

FOREIGN PATENTS

| Number | Country | Date |
| --- | --- | --- |
| 820,917 | France | Aug. 9, 1937 |